Aug. 16, 1966  W. S. BLANDING ETAL  3,267,256
PORTABLE ELECTRIC HEATING DEVICE
Filed June 22, 1962  3 Sheets-Sheet 1

INVENTORS
WENDELL S. BLANDING
AND JAMES P. HOCKER

By Clarence R. Patty, Jr.
ATTORNEY

Aug. 16, 1966 W. S. BLANDING ETAL 3,267,256
PORTABLE ELECTRIC HEATING DEVICE
Filed June 22, 1962 3 Sheets-Sheet 3
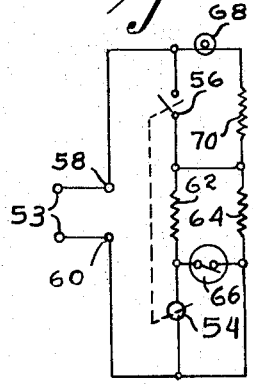
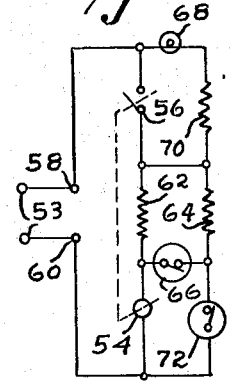
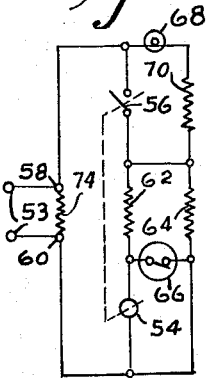
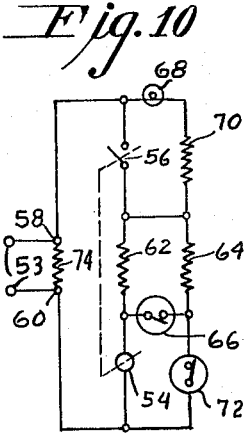
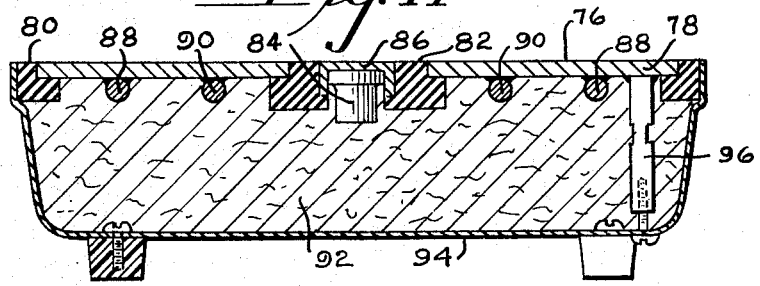
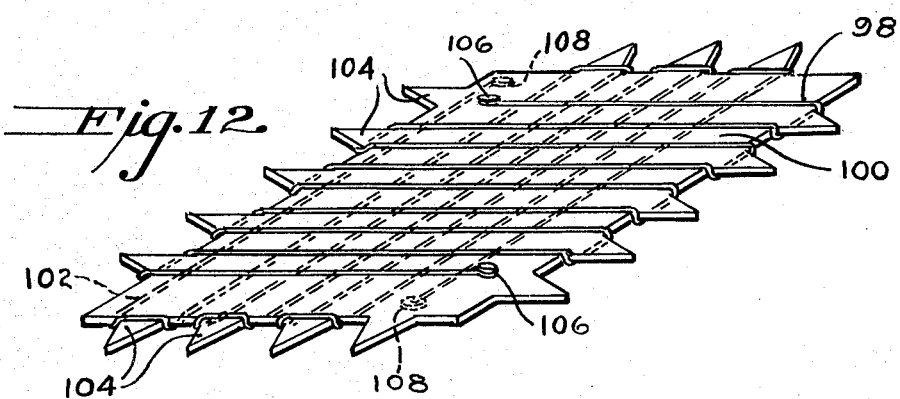
INVENTORS
WENDELL S. BLANDING
AND JAMES P. HOCKER
By Clarence R. Patty Jr.
ATTORNEY

United States Patent Office 3,267,256
Patented August 16, 1966

3,267,256
PORTABLE ELECTRIC HEATING DEVICE
Wendell S. Blanding, Painted Post, and James P. Hocker, Corning, N.Y., assignors to Corning Glass Works, Corning, N.Y., a corporation of New York
Filed June 22, 1962, Ser. No. 204,432
7 Claims. (Cl. 219—446)

The present invention relates to temperature programming and controlling devices and more particularly to portable electric cooking appliances but is in no way limited to such applications.

In the past, cooking temperature control in a portable electric appliance consisted mainly of a manually adjustable thermostat. Such a thermostat permitted a preset temperature to be reached and thereafter maintained. Some electrical appliance circuits, such as those used in automatic coffee makers, allow a preset temperature to be reached and then discontinue heating or reduce heating to maintain the coffee at serving temperature. Non-portable automatic electric ovens provide heating for a predetermined length of time at a preset maximum temperature commencing at a desired time. However, the timing device thereof measures the time the circuit is energized and does not distinguish between heating up time and the actual at-temperature cooking time. Such heretofore known appliances do not, for example, provide means for heating food to a desired temperature, reducing the heat output, maintaining such food at the desired temperature for a preset length of time while it is cooking, and thereafter reducing the temperature to maintain the food warm or cut off heating entirely. Such a program is particularly suitable for preparing commercially available frozen foods in accordance with package instructions.

An object of the present invention is to provide a temperature programming and controlling device.

Another object of this invention is to provide a programmed electric cooking appliance which will bring food to the boiling temperature, reduce the heat output, maintain the boiling temperature for a preset length of time and thereafter maintain the food at a serving temperature.

Still another object is to provide an automatic frozen food cooker.

A further object is to provide an improved electrical circuit for temperature programming and controlling.

A further object is to provide an improved heater element having a plurality of heating coils.

A still further object is to provide an improved electric double boiler appliance.

Additional objects, features, and advantages of the present invention will become apparent, to those skilled in the art, from the following detailed description and the attached drawings, on which, by way of example, only the preferred embodiments of the invention are illustrated.

According to the invention a heater unit is formed comprising a housing shell having a cooking utensil receiving surface, plurality of heater means adjacent the interior surface of said shell, timing means embodying a power cut-off switch, said timing means being connected to operate in accordance with a predetermined schedule, temperature sensing means embodying an electrical switch, and temperature indicating means responsive to said timing means, said heater means being responsive to said timing means and said temperature sensing means. The heater unit is provided with means for suitably positioning the cooking utensil on the receiving surface. The heater means may comprise a plurality of sinuated coils woven about a dielectric substrate. The heater unit circuit may embody a second temperature sensing means to prevent overheating in the event the circuit is energized when the unit is not loaded. Also according to the invention a double boiler unit is provided.

In the drawings,

FIG. 7 is a schematic electrical diagram illustrating the basic circuit of the instant invention.

FIG. 8 is a schematic electrical diagram embodying dry operation temperature sensing means.

FIG. 9 is a schematic electrical diagram embodying heating means for maintaining food at serving temperature after cooking is completed.

FIG. 10 is a schematic electrical diagram embodying both dry operation temperature sensing means and heating means for maintaining food at serving temperature after cooking is complete.

FIG. 11 is a cross sectional elevation of another embodiment of the heater unit of this invention.

FIG. 12 is an oblique view of a heater element of this invention having a plurality of heater coils.

Figure 1:
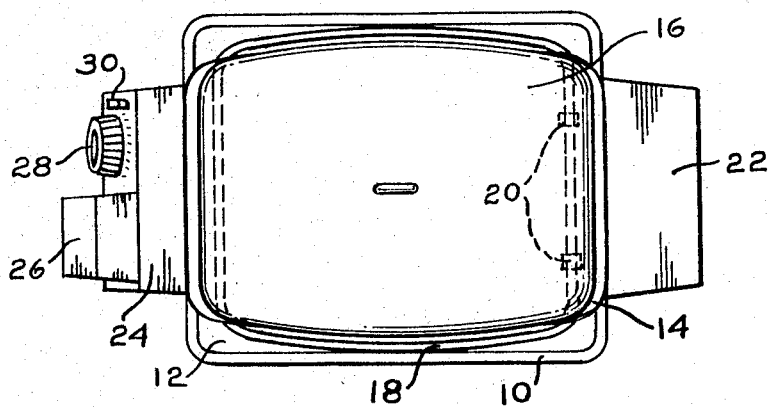
FIG. 1 is a top plan view of a frozen food cooker assembly, including a heater unit and cooking utensil, embodying the present invention.
Figure 2:
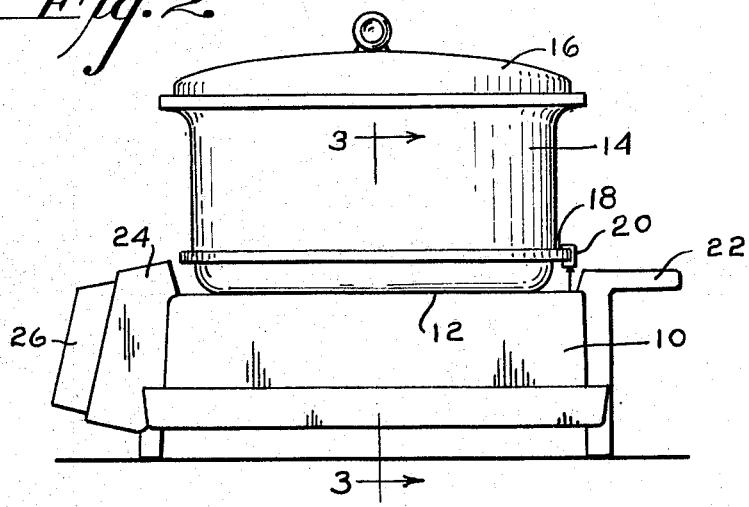
FIG. 2 is a side elevation of the frozen food cooker of FIG. 1.

FIGS. 1 and 2 show the frozen food cooker of this invention. A shell 10, in the form of an inverted shallow walled pan of low thermal expansion dielectric material, utilizes the exterior surface 12 as a temperature controlled cooking-utensil-receiving surface. Cooking utensil 14, with cover 16 may also be formed of low thermal expansion dielectric material or of metal, or the like. Surface 12, and the bottom surface of utensil 14 are preferably ground flat and smooth for efficient heat transfer. To facilitate proper positioning of said cooking utensil 14 upon surface 12, a guide ring 18, is provided and is hinged at one end by means of support members 20, which members are fixedly mounted to cooker handle 22. Being hinged, ring 18 may be conveniently raised out of the way to facilitate cleaning. Handle 24, in addition to being a handle, houses the timing means, not shown and hereinafter described, which means are enclosed by cover 26. Said timing means are operable by setting knob 28 for a desired length of cooking time. Pilot light 30, indicates when cooking is completed.

Figure 3:
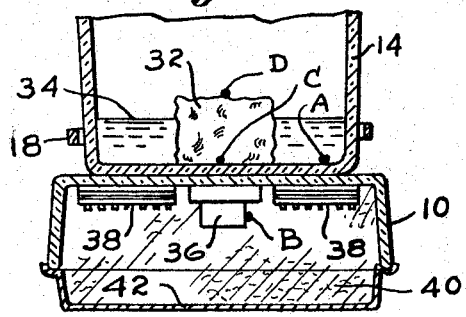
FIG. 3 is a cross sectional elevation taken along the line 3—3 of FIG. 2.

FIG. 3 shows a cross section of the frozen food cooker of FIGS. 1 and 2, and illustrates a package of frozen food 32, disposed within utensil 14, in water 34. A temperature sensing means embodying an electrical switch, such as thermostat 36, is disposed adjacent the interior surface of shell 10 and is located substantially centrally thereof. Heater element 38, having a plurality of heater coils, is also disposed adjacent the interior surface of shell 10, and is located surrounding thermostat 36 and spaced therefrom as hereinafter described. Heater element 38 and thermostat 36 are separated from each other and covered by thermal insulating material 40, which material is covered and held in place by cover 42.

Figure 4:
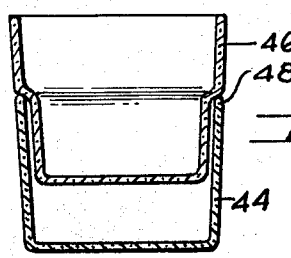
FIG. 4 is a side elevation of a double boiler arrangement suitable for use with the heater unit of FIG. 1.

FIG. 4 shows a double boiler unit suitable for use with the heating unit described in connection with the frozen food cooker of FIGS. 1 and 2. The lower or water boiling vessel 44, may be the same as, or similar to, utensil 14.

The upper or food containing vessel 46, may be a suitably shaped container having a configuration at the lower portion thereof, proportionately smaller than the opening in the upper portion of vessel 44, and a configuration at the upper portion thereof proportionately larger than said opening, the mating area of said portions forming a ledge 48 to engage the upper edge of vessel 44.

The boiling temperature of most foods is substantially the boiling temperature of water. Therefore, in the forming of a frozen food cooker such as that shown in FIGS. 1, 2, and 3, certain operating parameters must be considered. For example, the boiling temperature of water varies with the pressure at which it is being boiled. Considering the practical altitudes at which such an electrical applicance may be used, the boiling point of water may range from 192° F. to 212° F. Furthermore, commercially available thermostats are generally fabricated to operate within a tolerance of ±5° F. It has been found that the cooker of this invention embodying any said commercial thermostat will properly cook food at any practical altitude without the need for individual calibration of such cookers at the factory or point of use.

Referring now to FIG. 3, it is seen that thermostat 36 is surrounded by heater element 38, therefore, some heat is conducted from said element to said thermostat directly through shell 10. The ability of said thermostat to sense temperature changes resulting from such heat conduction is herein termed element sensitivity. Such element sensitivity is desirable and should be of a magnitude which, when boiling commences within utensil 14, arresting the temperature rise of the contents, the thermostat sensed temperature will continue to rise approximately 10 percent above the boiling temperature. Such a condition may be established by proper spacing of heater elements 38 from thermostat 36, which spacing will at least be a function of the overall co-efficient of heat transfer of the materials involved.

It is readily seen that the temperature sensed by the thermostat, illustrated in FIG. 3 by point B, is only a function of the temperature at the bottom of the medium being heated as illustrated by point C, since the two are separated by at least the bottom of utensil 14 and the top of shell 10. The ability of the thermostat to sense the temperature at point C is herein termed load sensitivity.

It has been found that for proper frozen food cooker operation, considering variance in boiling points of water and tolerance ranges of thermostats, the thermostat must have a high load sensitivity and a relatively low but not zero element sensitivity.

Figure 5:
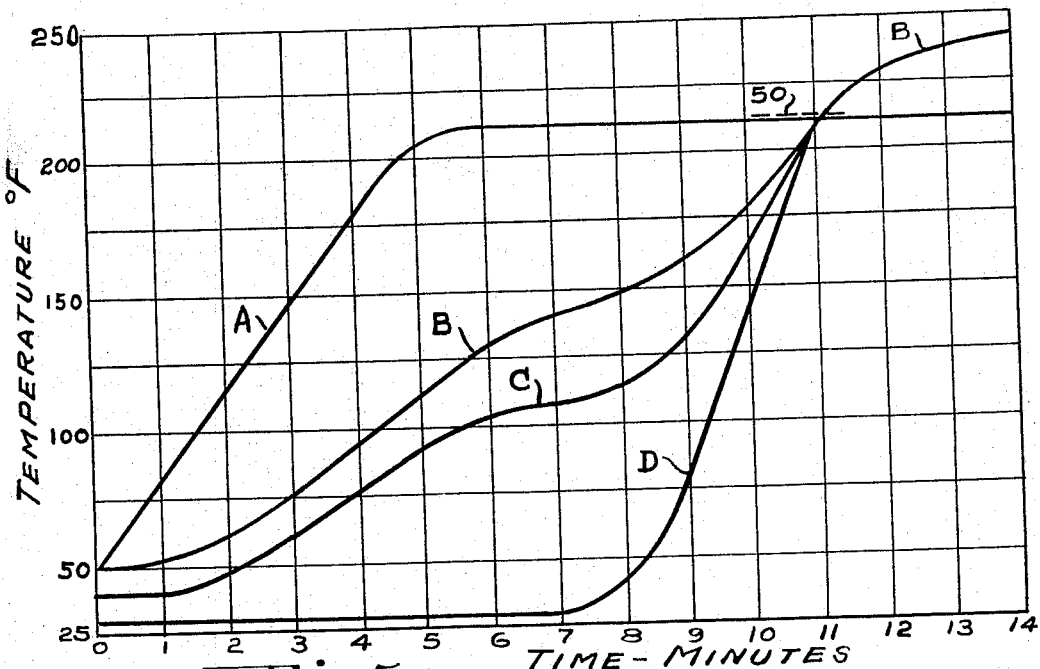
FIG. 5 is a graph of time vs. temperature illustrating the heating and cooking cycles of a single package of frozen food.

Referring now to FIG. 5, where curves A, B, C, and D are curves of temperature plotted against time at points A, B, C, and D respectively as shown on FIG. 3, for a single package of frozen food. As the cooker is energized, the water at point A rapidly rises in temperature until the rise is arrested when it reaches the boiling temperature. The bottom of the food, at point C, rises in temperature at a comparatively slow rate until the top of the food starts to thaw, as indicated by the sudden rise in curve D. The thermostat-sensed temperature indicated by curve B, is somewhat higher than the temperature at point C due to said element sensitivity. When the temperature sensed by thermostat 36 reaches the cut-off point, that is the point at which the thermostat interrupts electrical continuity therethrough, as indicated by dotted line 50, one of the heaters in the circuit is de-energized and heating is continued by a second, boiling-temperature-maintaining heater. The circuit components and operation thereof will be hereinafter described in detail This second heater causes the temperature sensed by the thermostat to stabilize at about 10 percent higher than said boiling temperature and the thermostat cut-off point, due to said element sensitivity. The temperature rise of the food is, of course, arrested at the boiling temperature.

The cut-off point of the thermostat is preferably selected to correspond to approximately the boiling point of water. As seen from curve B of FIG. 5, this will always fall on a very steep portion of curve B, thereby assuring thermostat cut-off at the right time regardless of the altitude at which the cooker is operated or the tolerance limits of the thermostat. For an example, a thermostat having a 205° F. cut-off rating may reasonably be used. Considering one extreme, operating the cooker at the lowest practical altitude having the highest boiling temperature of about 212° F. and said cooker embodying a maximum minus tolerance thermostat which will cut-off at 200° F. After the thermostat cuts off at 200° F., the said second heater will cause its temperature to rise approximately as illustrated above the cut-off line 50 of FIG. 5. Since the slope of curve B is not significantly different immediately above said line 50 from that below it, the food temperature, illustrated by curves C and D, will reach boiling temperature at about the same time as if cut-off took place at a higher temperature. The temperature at which the thermostat stabilizes will, of course, be substantially independent of the thermostat cut-off temperature, however, it will take longer to stabilize. Considering the other extreme, operating a cooker at the highest practical altitude having the lowest water boiling temperature of about 192° F., and said cooker embodying a maximum plus tolerance thermostat which will cut-off at 210° F. The thermostat will rise in temperature up to 210° F., as illustrated by curve B below line 50, and cut-off will take place there, while the boiling temperature of the contents will have been reached at 192° F. Due to said element sensitivity, causing a spread between curves B and C, the thermostat cut-off temperature and the boiling point will be reached at about the same time. Therefore, due to a predetermined element sensitivity and the steep slope of curve B at about the boiling temperature of water, the food will be brought to a boil and the thermostat will cut off at approximately the same time, regardless of the altitude or thermostat tolerance.

Figure 6:
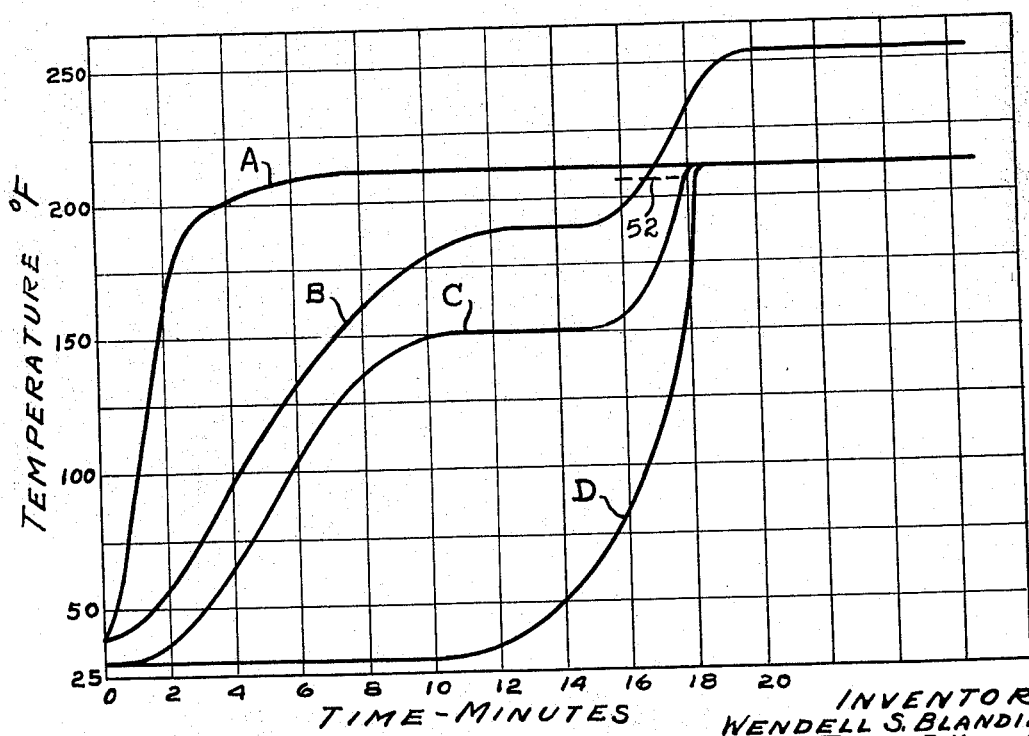
FIG. 6 is a graph of time vs. temperature illustrating the heating and cooking cycles of two packages of frozen food.

FIG. 6 illustrates temperatures measured at the same points described in connection with FIG. 5 except that two packages of frozen food were cooked at the same time. Dotted line 52 denotes the cut-off point of the thermostat. It is readily seen that, although the overall time to bring the food to a boil is obviously longer, the relationships and results described in connection with FIG. 5 are substantially the same and are, therefore, substantially independent of the size of the load.

FIG. 7 shows the basic circuit of the instant invention. Electrical energy is supplied through terminals 53. The timing means, such as a manually setable electric timer 54, is mechanically connected to power switch 56, which is closed when the timer is set and remains closed through the timing period. When said timing period has elapsed, while timer 54 is energized, switch 56 opens to break electrical continuity. When timer 54 is set, closing switch 56, and electrical power is supplied to terminals 58 and 60, a circuit is completed from terminal 58 through switch 56, heaters 62 and 64 and thermostat 66 to terminal 60. During this phase, pilot light 68 and its voltage dropping resistor 70 are shorted out by switch 56, and the timer motor is shorted out by thermostat 66. First heater 62 and second heater 64 raise the temperature of the medium being heated to a predetermined value, such as the boiling point of water. When the temperature sensed by thermostat 66 reaches said predetermined temperature and thereafter exceeds it, due to said element sensitivity hereinbefore described, thermostat, 66, having a cut-off temperature of approximately the same value as said predetermined temperature, will break electrical continuity thereby energizing the timer motor, while second heater 64 substantially maintains said medium at said predetermined temperature. Since the electric timer is a high impedance device, almost the entire line voltage will be dropped across it, therefore, although the timer motor circuit is completed through switch 56 and heater 62, heater 62 being a very low impedance device will not heat to any significant degree. Heater 64 will maintain said medium at said predetermined temperature for the period of time for which the timer was preset. After this preset time has elapsed, switch 56 will open, causing pilot light 68 to become energized. The pilot light circuit will then be completed through the voltage dropping resistor 70 and heater 64. Since most of the line voltage will be dropped across resistor 70, heater 64 will not heat to a significant degree, although the circuit is completed through it, because it is also a low impedance device. The pilot light having come on indicates the predetermined temperature has been reached and maintained for a preset length of time. It is readily seen that a buzzer, bell, or the like may be substituted for or employed in conjunction with said pilot light to provide said temperature indication.

It is readily seen that instead of said predetermined temperature being the boiling temperature of water, it may be any temperature desired. This would be accomplished by substituting either a fixed temperature thermostat having a different cut-off temperature or a manually adjustable thermostat for the fixed temperature thermostat 66, described hereinabove. It is also readily seen that a clock timer may be substituted for said timer 54, enabling the setting of the time for which the predetermined temperature is to be maintained, as well as the time when the circuit is to be energized. The clock portion, embodying a separate switch, would energize the circuit at a preset time, while the timer portion would operate in the same manner as described for timer 54.

In preparing certain foods, it may be desirable to have indication of the time when the boiling temperature is reached, such as for example, where food is added after the water is brought to a boil. In such an embodiment, a temperature indicating means such as a pilot light or the like may be placed in parallel with the timer motor to provide such indication. Such indicating means may be substituted for the means shown in FIG. 7 or be employed in conjunction with them.

FIG. 8 shows a circuit identical with that shown in FIG. 7 and one which functions in accordance with the description thereof, except that a dry operation thermostat 72 has been added. In an application, such as a frozen food cooker, there is always the possibility of energizing the cooker without any contents in the cooking utensil. To prevent overheating or other damage to the cooker, thermostat 72, having a cut-off temperature above the stabilization temperature of thermostat 66 is placed in series with both heaters. Thermostat 72 cut-off temperature is preferably just a few degrees higher than the stabilization temperature of thermostat 66, although it may be as much higher as desired within the temperature limits of the components and materials employed. When the heat supplied by heaters 62 and 64 is not absorbed by some medium, the predetermined temperature will be quickly reached and exceeded causing thermostat 66 to open first, followed by thermostat 72. If the timer 54 is preset when an empty cooker is energized, switch 56 will be closed causing the timer circuit to remain energized after thermostats 66 and 72 are open, allowing said timer to run out and open switch 56, although neither heater is operating.

FIG. 9 shows a circuit identical with that shown in FIG. 7 and one which functions in accordance with the description thereof except that a third heater 74 has been added. Heater 74 is a low wattage heater connected directly across the terminal potential and is always energized when power is supplied to terminals 58 and 60. Heater 74 aids in heating while heaters 62 and 64 are energized, and thereafter maintains a given temperature, such as the serving temperature of food, after heaters 62 and 64 are de-energized, as for example, after the food is cooked.

FIG. 10 shows a circuit identical with that shown in FIG. 7 and one which operates in accordance with the description thereof, except that dry operation thermostat 72 and heater 74 have been added. Thermostat 72 and heater 74 perform the individual functions described in connection with FIGS. 8 and 9, respectively.

FIG. 11 illustrates another embodiment of a heater unit. The heating surface 76 comprises a metallic plate 78, peripheral heat insulating material 80 and thermostat heat insulating material 82. Thermostat 84, is suitably positioned and covered by metallic plate 86 for high load sensitivity. Heaters 88 and 90, being tubular sheathed heaters or the like, are welded or otherwise bonded to the underside of plate 78. The underside of the heating surface is covered with heat insulating material 92, which is enclosed by cover 94, secured to the heater unit by means of suitably shaped, low thermal conductivity connectors 96.

FIG. 12 illustrates an economical dual coil heater element construction suitable for use with the frozen food cooker shown in FIGS. 1, 2, and 3. Ribbon-type heater 98 is woven in form of a sinuated coil on one surface of a dielectric substrate 100, and ribbon-type heater 102 is woven in form of a sinuated coil on the other surface thereof. The coils are formed by engaging the ribbons around protrusions 104, about the periphery of substrate 100. Forming protrusions 104, enables ease of weaving said coils and removes excess peripheral material which would, in operation, be at a lower temperature than the center of the substrate causing the substarte to become warped or bent. Separate terminals 106 and 108 enable electrical connection to each of these coils individually. By this construction more uniform heating is possible since each heater is substantially on one surface only. In addition, such elements may be formed with a suitably positioned hole to facilitate a thermostat, or may be formed in, for example, two symmetrical L shaped sections which could be disposed surrounding a thermostat and be electrically interconnected. Such two-section construction particularly lends itself to economic mass production.

Although the present invention has been described with respect to specific details of certain embodiments thereof, it is not intended that such details be limitations upon the scope of the invention except insofar as set forth in the following claims.

What is claimed is:

1. A portable electric heating device comprising a housing of low thermal expansion dielectric material having a cooking utensil receiving surface, terminals for application of electric power, timing means embodying a power cut-off switch, said timing means being operable in accordance with a predetermined schedule, first and second electrical heater means electrically connected in parallel for heating a medium to a predetermined first temperature and maintaining said first temperature for a predetermined first period of time and thereafter said second heater means maintaining a second temperature for a second period of time, said first heater means being electrically connected through said cut-off switch to said terminals, said second heater means being electrically connected to said terminals, a first thermostat having a cut-off temperature of substantially said first temperature, upon being preset for said first period of time said timing means immediately closing said power cut-off switch thereby energizing said first heater means, said timing means being controlled by said first thermostat so that after said medium has been heated to said first temperature said timing means measure said predetermined first period of time, upon expiration of said first period of time said timing means opening said power cut-off switch de-energizing said first heater means, a second thermostat having a cut-off temperature higher than said first temperature, means for indicating completion of said first period of time, and dielectric, resilient, heat insulating material, said first and second thermostats being disposed in heat exchange relationship with said cooking utensil receiving surface of said housing, said heater means being disposed in heat exchange relationship with said cooking utensil receiving surface of said housing surrounding said first and second thermostats and spaced therefrom, said first heater means being controlled by said timing means and said first and second thermostats, said dielectric, resilient, heat insulating material being disposed within said housing adjacent said first and second thermostats and said first and second heater means.

2. A portable electric heating device comprising a housing of low thermal expansion dielectric material having a cooking utensil receiving surface, terminals for application of electric power, timing means embodying a power cut-off switch, first and second thermostats disposed in heat exchange relationship with said cooking utensil receiving surface of said housing, electrical heater means electrically connected through said cut-off switch to said terminals disposed in heat exchange relationship with said cooking utensil receiving surface of said housing surrounding said first and second thermostats and spaced therefrom for heating a medium to a predetermined temperature and maintaining said temperature for a predetermined period of time, said first thermostat having a cut-off temperature of substantially said predetermined temperature, said second thermostat having a cut-off temperature higher than said predetermined temperature, said heater means being controlled by said timing means and said first and second thermostats, upon being preset for said predetermined period of time, said timing means immediately closing said power cut-off switch thereby energizing said heater means, said timing means being controlled by said first thermostat so that after said medium has been heated to said predetermined temperature said timing means measure said predetermined period of time, upon expiration of said period of time said timing means opening said power cut-off switch de-energizing said heater means, and dielectric, resilient, heat insulating material disposed within said housing adjacent said first and second thermostats and said heater means.

3. A portable electric heating device comprising a housing of low thermal expansion dielectric material having a cooking utensil receiving surface, terminals for application of electric power, timing means embodying a power cut-off switch, first and second thermostats disposed in heat exchange relationship with said cooking utensil receiving surface of said housing, first electrical heater means electrically connected through said cut-off switch to said terminals, second electrical heater means electrically connected to said terminals, said first and second heater means being disposed in heat exchange relationship with said cooking utensil receiving surface of said housing surrounding said first and second thermostats and spaced therefrom for heating a medium to a predetermined first temperature and maintaining said first temperature for a predetermined first period of time with said second heater means thereafter maintaining a second temperature for a second period of time, said first thermostat having a cut-off temperature of substantially said first temperature, said second thermostat having a cut-off temperature higher than said first temperature, said first heater means being controlled by said timing means and said first and second thermostats, upon being preset for said first period of time said timing means immediately closing said power cut-off switch thereby energizing said first heater means, said timing means being controlled by said first thermostat so that after said medium has been heated to said first temperature said timing means measure said predetermined first period of time, upon expiration of said first period of time said timing means opening said power cut-off switch de-energizing said first heater means, and dielectric, resilient, heat insulating material disposed within said housing adjacent said first and second thermostats and said first and second heater means.

4. An electrical heater circuit comprising input terminals, an electrically operated timer electrically connected to one of said terminals, a power cut-off switch controlled by said timer electrically connected to the other of said terminals, first electrical heater means electrically connected intermediate said cut-off switch and said timer, second electrical heater means electrically connected intermediate said cut-off switch and said one of said terminals, and temperature sensing means for electrically shorting said timer until a predetermined temperature is sensed, said sensing means being electrically connected to a point intermediate said first heater means and said timer and to said one of said terminals.

5. The circuit of claim 4 comprising second temperature sensing means for interrupting the heater circuit electrically connected to said one of said terminals in series with said second heater means and the first temperature sensing means.

6. The circuit of claim 4 further comprising third electrical heater means electrically connected to said terminals.

7. The circuit of claim 5 further comprising third electrical heater means electrically connected to said terminals.

References Cited by the Examiner

UNITED STATES PATENTS

| | | | |
|---|---|---|---|
| 1,474,384 | 11/1923 | Russell | 338—280 |
| 1,702,480 | 2/1929 | Newsom | 219—441 |
| 1,977,454 | 10/1934 | Price | 99—328 |
| 2,088,728 | 8/1937 | Stranszky | 219—330 |
| 2,369,932 | 2/1945 | Allen | 219—441 |
| 2,379,504 | 7/1945 | Thompson | 219—282 |
| 2,387,460 | 10/1945 | Myers | 219—450 |
| 2,410,384 | 10/1946 | Linsay | 219—491 |
| 2,463,329 | 3/1949 | Stansbury | 219—422 |
| 2,509,693 | 5/1950 | Morrison | 99—332 X |
| 2,659,799 | 11/1953 | Ireland | 219—542 X |
| 2,659,800 | 11/1953 | Zander | 338—280 |
| 2,734,826 | 2/1956 | Stentz et al. | |
| 2,771,536 | 11/1956 | Page | 219—431 |
| 2,806,123 | 9/1957 | Steinbock | 219—312 |
| 2,812,414 | 11/1957 | Weeks | 219—448 X |
| 2,955,186 | 10/1960 | Ritter | 219—489 |
| 2,978,564 | 4/1961 | Blanding et al. | 219—449 |
| 3,097,285 | 7/1963 | Page | 219—491 |

FOREIGN PATENTS 286,807   3/1928   Great Britain.

RICHARD M. WOOD, Primary Examiner.

ANTHONY BARTIS, Examiner.